(12) United States Patent
Chang et al.

(10) Patent No.: US 6,451,472 B1
(45) Date of Patent: Sep. 17, 2002

(54) LITHIUM BATTERY AND MANUFACTURING METHOD THEREOF

(75) Inventors: Youn-han Chang, Kyungki-do; Jung-ho Kim, Cheonan, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/541,700

(22) Filed: Apr. 3, 2000

(30) Foreign Application Priority Data

Apr. 16, 1999 (KR) .............................. 99-13499

(51) Int. Cl.⁷ .............................. H01M 6/10; H01M 4/74
(52) U.S. Cl. .................. 429/94; 429/241; 429/242; 29/623.2; 29/623.3; 29/623.5
(58) Field of Search .................. 429/94, 241, 242; 29/623.1, 623.2, 623.3, 623.5

(56) References Cited

U.S. PATENT DOCUMENTS

| | | | | |
|---|---|---|---|---|
| 4,929,519 A | * | 5/1990 | Catotti ........................ 429/94 |
| 5,185,224 A | * | 2/1993 | Barnabei et al. ......... 429/242 X |
| 5,443,925 A | * | 8/1995 | Machida et al. .............. 429/94 |
| 5,540,741 A | * | 7/1996 | Gozdz et al. .............. 29/623.5 |
| 5,552,239 A | * | 9/1996 | Gozdz et al. ................ 429/94 |
| 5,925,482 A | * | 7/1999 | Yamashita ................ 429/94 X |
| 5,964,903 A | * | 10/1999 | Gao et al. .................. 29/623.1 |
| 5,981,107 A | * | 11/1999 | Hamano et al. ........ 429/242 X |
| 6,051,038 A | * | 4/2000 | Howard et al. ........... 429/94 X |
| 6,143,042 A | * | 11/2000 | Rogers ...................... 29/623.1 |
| 6,232,015 B1 | * | 5/2001 | Wyser ...................... 429/94 X |

FOREIGN PATENT DOCUMENTS

JP        5-74496        3/1993

* cited by examiner

*Primary Examiner*—Stephen Kalafut
(74) *Attorney, Agent, or Firm*—Leydig, Voit & Mayer, Ltd.

(57) ABSTRACT

A lithium polymer battery having a positive electrode including a positive electrode current collector and positive electrode sheets on at least one surface of the positive electrode current collector, the positive electrode sheets having a positive electrode active material layer as a main component, a negative electrode including a negative electrode current collector and negative electrode sheets on at least one surface of the negative electrode current collector, the negative electrode sheets having a negative electrode active material layer as a main component, and a separator interposed between the positive electrode and the negative electrode, for insulating the electrodes from each other. The positive electrode and the negative electrode of the lithium polymer battery each include a plate and are wound with the separator interposed therebetween.

6 Claims, 4 Drawing Sheets

LITHIUM BATTERY AND MANUFACTURING METHOD THEREOF

BACKGROUND OF THE INVENTION

1. Field of the Invention

The present invention relates to a lithium polymer battery which is simply fabricated, and which has an improved assembly structure in which a positive electrode, a negative electrode and a separator are stacked, and a manufacturing method thereof.

2. Description of the Related Art

Lithium secondary batteries are classified into lithium metal batteries, lithium ion batteries and lithium polymer batteries according to the type of lithium used. A lithium polymer battery is a battery in which lithium ions move between a cathode made of lithium oxide and a negative electrode made of a carbon material during charging/discharging to generate an electromotive force. The lithium polymer battery has an advantage in that it is explosion-free due to the use of a solid polymer electrolyte having an ion conductivity higher than a liquid electrolyte. Also, unlike other kinds of batteries, the lithium polymer battery can overcome the problem of battery performance deteriorating due to byproducts generated during charging and/or discharging. Furthermore, due to bendability, much attention has recently been paid to the lithium polymer batteries as next generation batteries.

As shown in FIG. 1, a conventional lithium polymer battery 10 includes a positive electrode (or a cathode in a battery) 11 consisting of a positive electrode current collector and a positive electrode active material layer tightly fixed to at least one surface of the positive electrode current collector, a negative electrode (or an anode in a battery) 12 consisting of a negative electrode current collector and a negative electrode active material layer tightly fixed to at least one surface of the negative electrode current collector, and a separator 13 interposed between the positive electrode 11 and the negative electrode 12, for insulating the positive electrode 11 and the negative electrode 12 from each other. The positive electrode 11, the negative electrode 12 and the separator 13 constitute an assembled battery and a plurality of assembled batteries are stacked to form the battery 10.

As shown in the drawing, a positive electrode tab 14 and a negative electrode tab 15 are drawn out from the positive electrode 11 and the negative electrode 12, respectively, along the peripheries of each electrode plate. A plurality of positive electrode tabs 14 and a plurality of negative electrode tabs 15 are collected and are bent into a V-shape. The ends of the V-shaped positive and negative electrode tabs 14 and 15 are welded to a positive electrode terminal 16 and a negative electrode terminal 17, respectively.

The battery 10 having the above-described configuration is mounted within a case 18. The case 18 has a space 18a in which the battery 10 is accommodated, and the positive electrode terminal 16 and the negative electrode terminal 17 protrude to the outside of the case 18 when the case 18 is hermetically sealed.

Here, various types of the lithium polymer battery 10 can be fabricated. In particular, assembled batteries which have recently been put into practical use include bi-cell assembled batteries. A bi-cell assembled battery is constructed such that a separator is fixed to both sides of a negative electrode and a positive electrode is fixed to the outer surface of the separator.

The lithium polymer battery 10 shown in FIG. 1 is constructed such that a plurality of bi-cell assembled batteries are stacked and the positive and negative electrode tabs 14 and 15 are drawn out therefrom and welded to the positive electrode terminal 16 and the negative electrode terminal 17, respectively.

The conventional lithium polymer battery 10 is fabricated as follows. First, a plurality of positive and negative electrode current collectors are provided. As described above, a positive electrode active material layer and a negative electrode active material layer are tightly fixed to both surfaces of the positive and negative electrode current collectors, respectively, thereby completing the positive electrode 11 and the negative electrode 12. Then, the stacked plurality of positive and negative electrode tabs 14 and 15 drawn out from the positive and negative electrode current collectors are collected, respectively, and the battery 10 is accommodated within the case 18.

Next, the ends of the collected positive and negative electrode tabs 14 and 15 are welded to the positive and negative electrode terminals 16 and 17, respectively.

During the above-described procedure, some of the plurality of positive and negative electrode tabs 14 and 15 may not be properly connected to the positive and negative electrode terminals 16 and 17. Accordingly, the internal resistance of the battery 10 may increase, which adversely affects the performance of the lithium polymer battery 10.

The positive electrode 11 and the negative electrode 12 have positive and negative electrode active material layers on both surfaces of positive and negative electrode current collectors. Since the positive electrode active material layer on the rear surface of the positive electrode 11 is relatively far from the negative electrode 12 compared to the positive electrode active material layer on the front surface of the positive electrode 11, movement of lithium ions does not occur smoothly, which lowers high-rate discharging efficiency.

Since several steps of lamination are necessary for fabricating an assembled battery having the positive electrode 11, the negative electrode 12 and the separator 13 interposed therebetween, and a process of stacking a plurality of bi-cell assembled batteries is necessary for completing the lithium polymer battery 10, there are limits associated with continuous mass production. Also, burs may be generated at the ends of positive and negative electrode current collectors in the course of cutting the positive electrode 11, the negative electrode 12 and the separator 13 to a desirable size. Burs may short-circuits in a battery and undesirably increase the rate of defectiveness in completed batteries.

SUMMARY OF THE INVENTION

To solve the above problems, it is an objective of the present invention to provide an improved lithium polymer battery in view of the structure and manufacturing method thereof, in which an assembled battery is fabricated by winding a positive electrode, a negative electrode and a separator to then be mounted in a case, and a method for manufacturing the same.

Accordingly, to achieve the above objective, there is provided a lithium polymer battery having a positive electrode consisting of a positive electrode current collector and positive electrode sheets formed on at least one surface of the positive electrode current collector, the positive electrode sheets having a positive electrode active material layer as a main component, a negative electrode consisting of a negative electrode current collector and negative electrode sheets formed on at least one surface of the negative electrode current collector, the negative electrode sheets having a negative electrode active material layer as a main component, and a separator interposed between the positive electrode and the negative electrode, for insulating the electrodes from each other, wherein the positive electrode and the negative electrode of the lithium polymer battery are each formed of a plate and are wound with the separator interposed therebetween.

Also, the positive and negative electrode current collectors are preferably formed of either an expanded metal or a punched metal.

Further, the separator is preferably formed of polyethylene.

According to another aspect of the present invention, there is provided a method for manufacturing a lithium polymer battery, the method including the steps of preparing active material slurry for positive and negative electrode sheets, preparing the positive and negative electrode sheets using the active material slurry, preparing a positive electrode and a negative electrode by tightly fixing the positive and negative electrode sheets to at least each one surface of positive and negative electrode current collectors, extracting a plasticizer from the positive and negative electrodes, positioning a separator between the positive and negative electrodes and winding the resultant structure to complete a battery unit, mounting the battery within a case and impregnating a predetermined amount of an electrolytic solution, and hermetically sealing the case to complete the battery.

Also, in the step of completing the battery unit, the cross section of the battery unit is preferably made elliptic by applying a unidirectional tensile force so as to compactly mount the battery unit in a space of the case when simultaneously winding the positive electrode, the separator and the negative electrode.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

A lithium polymer battery according to a preferred embodiment of the present invention and a manufacturing method thereof will now be described in detail with reference to the accompanying drawings.

Figure 1:
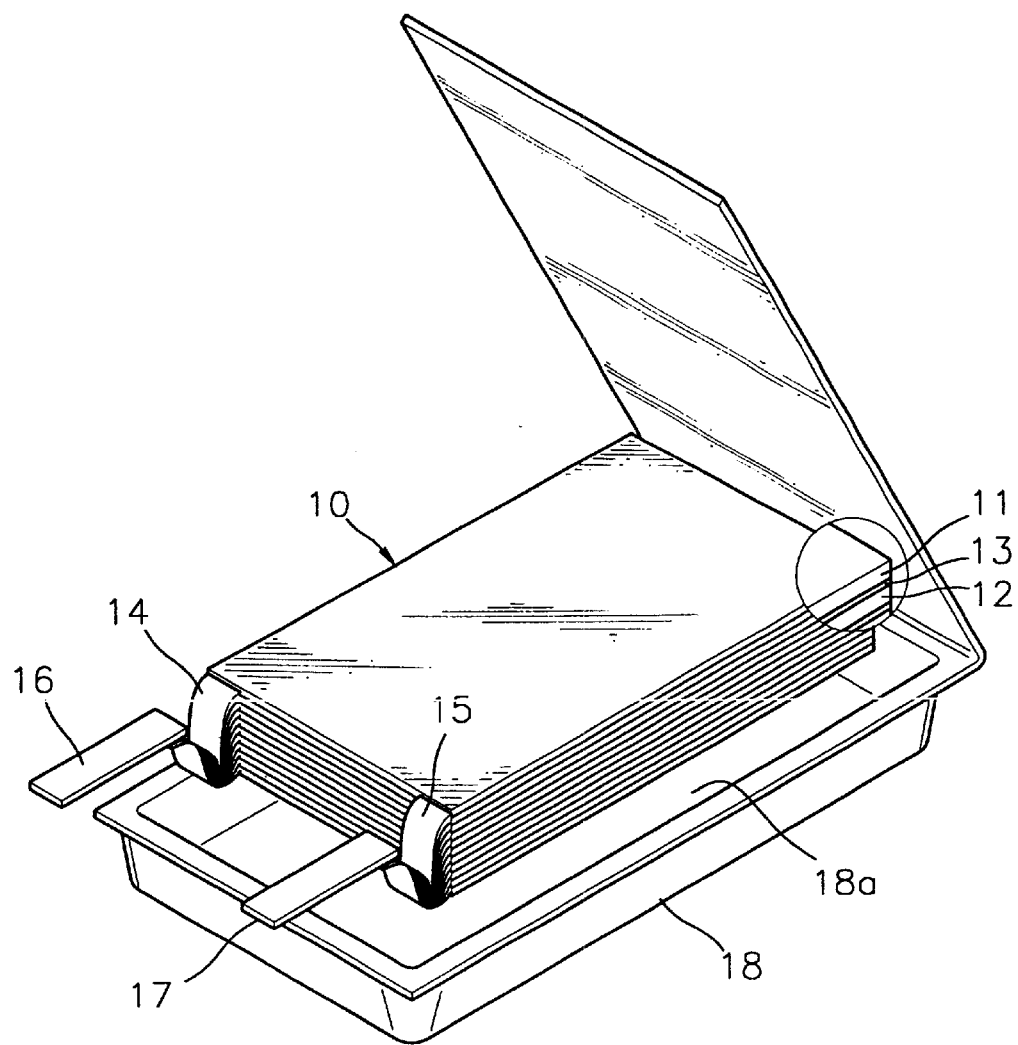
FIG. 1 is an exploded perspective view illustrating a conventional lithium polymer battery.
Figure 2:
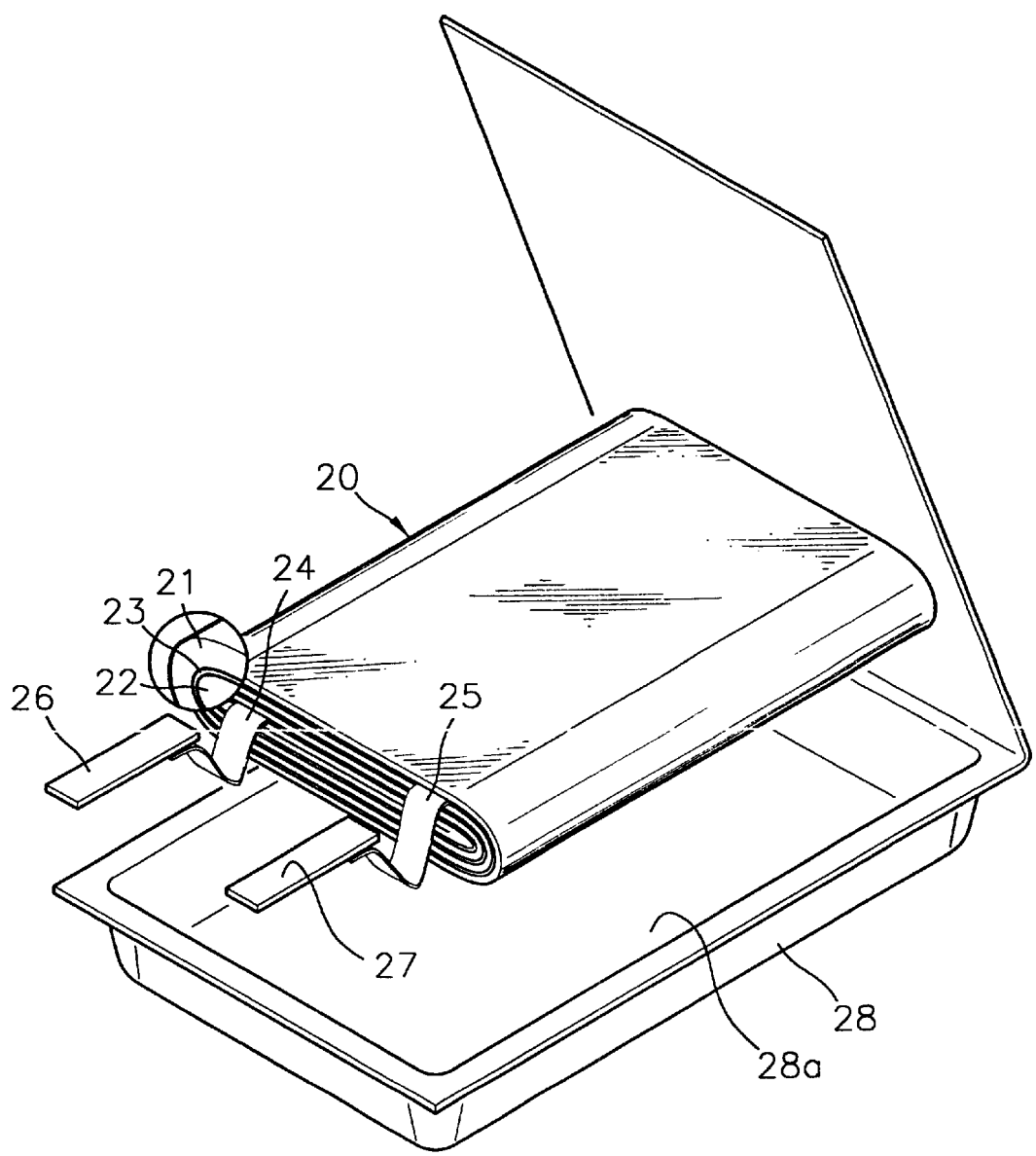
FIG. 2 is an exploded perspective view illustrating a lithium polymer battery according to the present invention.

FIG. 2 illustrates a lithium polymer battery according to the present invention. Referring to FIG. 2, a lithium polymer battery 20 includes a positive electrode 21 including a positive electrode active material layer tightly fixed to a positive electrode current collector, a negative electrode 22 including a negative electrode active material layer tightly fixed to a negative electrode current collector, and a separator 23 interposed between the positive electrode 21 and the negative electrode 22.

A positive electrode tab 24 and a negative electrode tab 25 are drawn out from the positive electrode 21 and the negative electrode 22, respectively, and the ends of the positive and negative electrode tabs 24 and 25 are welded to a positive electrode terminal 26 and a negative electrode terminal 27, respectively. The lithium polymer battery 20 including the positive electrode 21, the negative electrode 22 and the separator 23 is mounted within a case 28. A space 28a in which the lithium polymer battery 20 is accommodated is formed in the case 28. The positive and negative electrode terminals 26 and 27 protrude outside of the case 28 when the case 28 is hermetically sealed.

Figure 3:
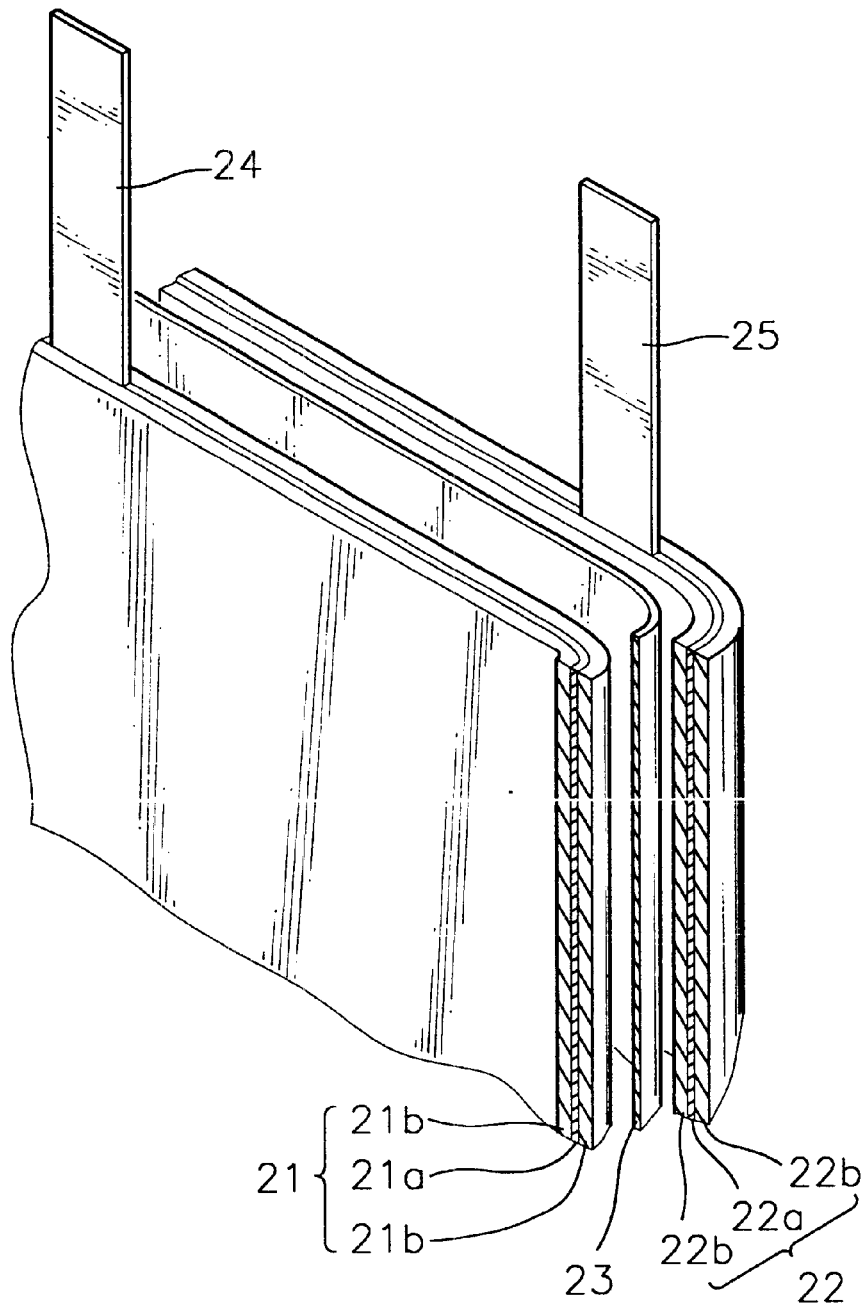
FIG. 3 is a partly cut-away exploded perspective view illustrating an assembled battery shown in FIG. 2.

Now, the configuration of the battery 20 will be described in more detail with reference to FIG. 3.

The positive electrode 21 includes a positive electrode current collector 21a made of an expanded metal, such as aluminum, and positive electrode sheets 21b tightly fixed to both surfaces of the positive electrode current collector 21a and each having a positive electrode active material layer as a main component. A positive electrode tab 24 is drawn out from a periphery of the positive electrode current collector 21a.

The negative electrode 22 installed to face the positive electrode 21 with the separator 23 disposed therebetween, includes a negative electrode current collector 22a made of an expanded metal or a punched metal, such as copper, and negative electrode sheets 22b tightly fixed to both surfaces of the negative electrode current collector 22a and each having a negative electrode active material layer as a main component. Like the positive electrode tab 24, a negative electrode tab 25 is drawn out from either periphery of the negative electrode current collector 22a.

The battery 20 is fabricated by winding a plate of the positive electrode 21 and a plate of the negative electrode 22 with the separator 23 interposed therebetween, unlike the conventional battery in which a positive electrode, a negative electrode and a separator, are cut in laminated plates, each having a predetermined size, and stacked in sequence. Accordingly, the process for forming a battery is different from the conventional one.

Figure 4:
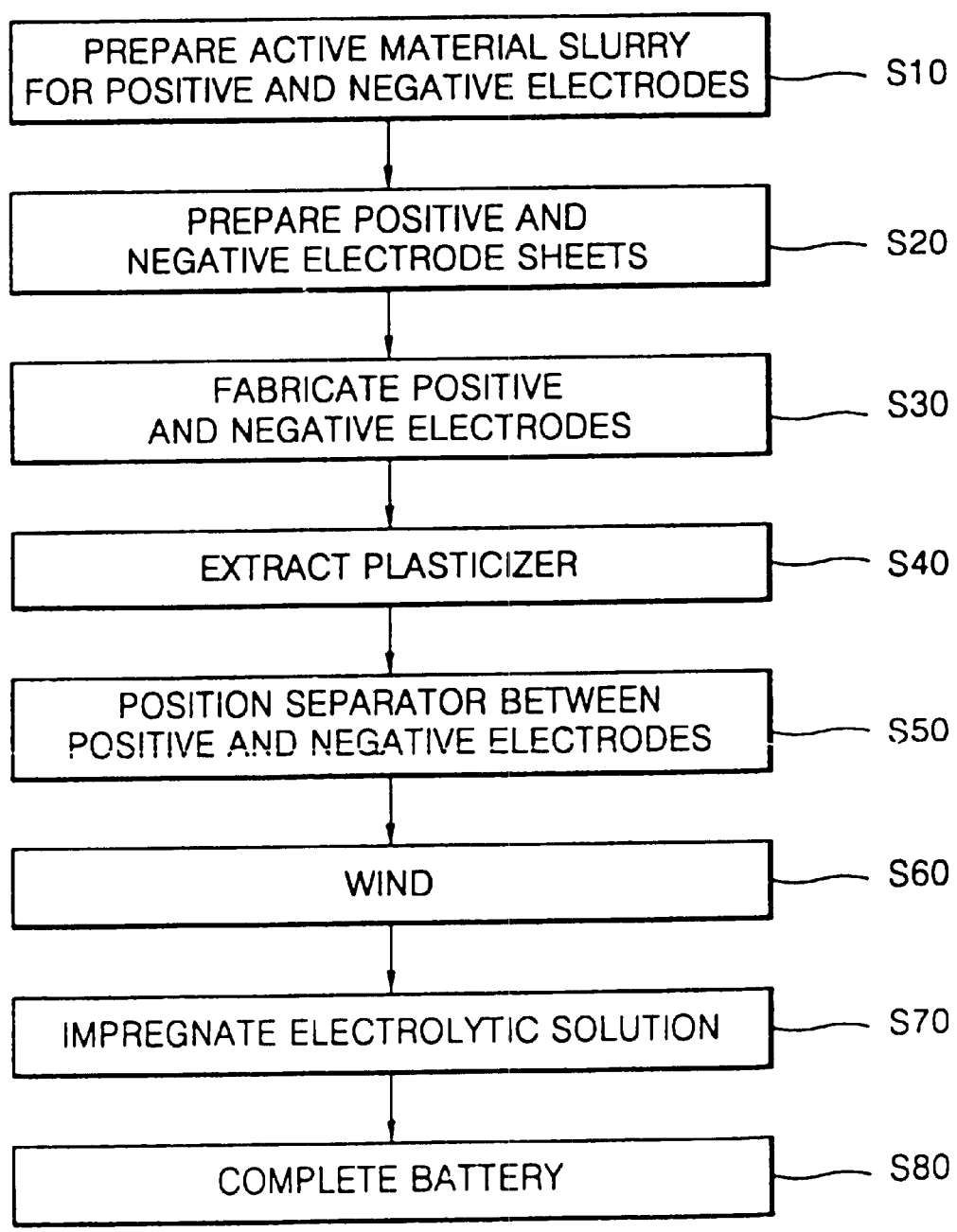
FIG. 4 is a diagram illustrating a sequence of steps in a manufacturing process of a lithium polymer battery according to the present invention.

FIG. 4 is a diagram illustrating a sequence of steps in a manufacturing process of a lithium polymer battery according to the present invention.

The method for manufacturing a lithium polymer battery 20 according to the present invention will be described below with reference to FIG. 4.

First, a slurry having active materials for the positive electrode sheets 21b and the negative electrode sheets 22b, which are main components, is prepared (step S10).

The active material slurry for the positive electrode sheets 21b is prepared to have a viscosity of 20,000 to 30,000 cps by adding 10% by weight of polyvinylidene fluoride (PVDF) as a binder, 15 to 18% by weight of dibutyl phthalate (DBP) as a plasticizer, and 2 to 5% by weight of carbon black as a conductive material to an organic solvent such as acetone, dissolving lithium complex oxide such as lithium nickel oxide, lithium cobalt oxide or lithium manganese oxide and then sufficiently stirring the same.

The active material slurry for the negative electrode sheets 22b is prepared to have a predetermined viscosity by adding a binder, a plasticizer and a conductive material, which are the same as those used in preparing the active material slurry for the positive electrode sheets 21b, to an organic solvent such as N-methyl-2-pyrrolidone (NMP), and then dissolving 70% by weight of a carbon material as a negative electrode active material.

The positive electrode sheets 21b and the negative electrode sheets 22b are prepared from the resulting active material slurry by a well-known doctor blade method (step S20).

The thus-prepared positive and negative electrode sheets 21b and 22b are cut to a predetermined size and the cut positive and negative electrode sheets 21b and 22b are laminated on the surface of the positive and negative electrode current collectors 21a and 22a, respectively.

In other words, the positive electrode sheets 21b are closely fixed to both surfaces of the positive electrode current collector 21a made of an expanded metal or a punched metal such as aluminum, and the negative electrode sheets 22b are closely fixed to both surfaces of the negative electrode current collector 22a made of an expanded metal or a punched metal such as copper, and then the resultant structures are rolled under heat and pressure, thereby fabricating plates of the positive electrode 21 and the negative electrode 22 (step S30).

Subsequently, the positive electrode 21 and the negative electrode 22 are precipitated in an organic solvent such as ether and stirred. In the course of stirring for about 30 minutes, DBP which is a plasticizer present in the positive electrode 21 and the negative electrode 22, is extracted and a space into which an electrolyte is to be impregnated is produced in place of the space from which the plasticizer is extracted (step S40).

Next, the positive electrode 21 and the negative electrode 22 are heated in a vacuum furnace at a high temperature, preferably, at a temperature of about 120° C., for about 12 hours and dried, and then the separator 23 from which the plasticizer is extracted is positioned between the completed positive and negative electrodes 21 and 22 (step S50).

Here, a polyethylene (PE) layer is preferably used as the separator 23. As is known well, the PE layer is capable of charging and discharging such that lithium ions communicate between a positive electrode and a negative electrode though micro pores.

A battery unit in which the positive electrode 21, the separator 23 and the negative electrode 22 are sequentially positioned, is wound by a separately provided winding apparatus (not shown) (step S60). During winding, the cross section of the battery unit is maintained substantially elliptical by applying a unidirectional tensile force. As a result, the battery unit can be compactly accommodated in the space 28a of the case 28.

Then, a predetermined amount of an electrolyte solution is added to the space 28a (step S70).

If the impregnation of the electrolyte solution is completed in such a manner, the completed battery unit is mounted in the case 28 and hermetically sealed, thereby completing the lithium polymer battery 20 (step S80).

As described above, the lithium polymer battery according to the present invention and the method for manufacturing the same have the following advantages.

First, each of the positive electrode and the negative electrode plates are continuously wound to complete a battery, without a process of laminating a separator and a process of cutting and stacking a positive electrode and a negative electrode, thereby simplifying the manufacturing process and greatly reducing the time required for manufacturing the battery.

Second, since a process of cutting positive and negative electrode current collectors is not necessary, it is possible to solve a problem of burs which often occur at the ends of the positive and negative electrode current collectors, thereby reducing the rate of defects in the completed batteries.

Third, since a plasticizer can be extracted after the positive and negative electrodes are fabricated, the time required for extracting the plasticizer can be greatly reduced.

Fourth, since only one positive and negative electrode tab is drawn out to then be welded to positive and negative electrode terminals, respectively, the rate of welding defects can be greatly reduced.

Fifth, since the positive electrode and the negative electrode are positioned with a separator interposed therebetween so that a battery reaction is facilitated, the energy density increases by about 5 to 10%, and the high-rate discharging efficiency is improved by about 10% due to an increase in the utilization efficiency of electrode plates.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lithium battery having:
   a positive electrode including a positive electrode current collector and a positive electrode sheet on a surface of the positive electrode current collector, the positive electrode sheet containing a positive electrode active material layer as a main component;
   a negative electrode including a negative electrode current collector and a negative electrode sheet on a surface of the negative electrode current collector, the negative electrode sheet containing a negative electrode active material layer as a main component;
   a separator interposed between the positive electrode and the negative electrode, insulating the positive and negative electrodes from each other, wherein the positive electrode, the negative electrode, and the separator interposed therebetween are a wound battery unit having, in cross-section, a substantially elliptical shape; and
   an electrically insulating case having a hermetically sealed periphery through which positive and negative electrode terminals respectively connected to the positive and negative current collectors protrude, and having a recess in which the battery unit is disposed.

2. The lithium battery according to claim 1, wherein the positive and negative electrode current collectors are one of an expanded metal and a punched metal.

3. The lithium battery according to claim 2, including a positive electrode tab extending from one end of the positive electrode current collector.

4. The lithium battery according to claim 2, including a negative electrode tab extending from one end of the negative electrode current collector.

5. The lithium battery according to claim 1, wherein the separator is polyethylene.

6. A method for manufacturing a lithium battery comprising:
   preparing respective active material slurries for positive and negative electrode sheets;
   preparing the positive and negative electrode sheets using the active material slurries;
   preparing a positive electrode and a negative electrode by respectively fixing the positive and negative electrode sheets to respective surfaces of positive and negative electrode current collectors;
   extracting a plasticizer from the positive and negative electrode sheets;

positioning a separator between the positive and negative electrodes and winding the positive and negative electrodes with the separator interposed therebetween, while applying a unidirectional tensile force, to produce a battery unit having, in cross-section, a substantially elliptical shape;

connecting positive and negative electrode terminals to the positive and negative current collectors, respectively;

mounting the battery unit within an electrically insulating case having a periphery for hermetically sealing of the case, with the battery unit in a recess of the electrically insulating case, the positive and negative terminals extending across the periphery; and hermetically sealing the electrically insulating case by sealing the periphery with the positive and negative terminals between and protruding from the periphery.

* * * * *